United States Patent [19]

Krueger

[11] 4,111,699

[45] Sep. 5, 1978

[54] O-NITRO-O-AZAARYLIDENE PHOTOBLEACHABLE DYES AND PHOTOGRAPHIC ELEMENTS UTILIZING THEM

[75] Inventor: Spencer Milton Krueger, Rochester, N.Y.

[73] Assignee: Eastman Kodak Company, Rochester, N.Y.

[21] Appl. No.: 803,825

[22] Filed: Jun. 6, 1977

[51] Int. Cl.$^2$ .................. G03C 1/78; G03C 1/84; G03C 1/36
[52] U.S. Cl. ...................... 96/87 R; 96/84 R; 96/89; 96/101; 96/114.1; 542/405
[58] Field of Search ............... 96/101, 84 R, 87 R, 96/89, 114.1; 542/405

[56] References Cited

U.S. PATENT DOCUMENTS 3,984,248  10/1976  Sturmer ..................... 96/87 R
4,033,948   7/1977  Brown ...................... 96/101

Primary Examiner—Won H. Louie, Jr.
Attorney, Agent, or Firm—J. G. Levitt

[57] ABSTRACT

Novel o-nitro-o-azaarylidene dyes are provided in which the o-nitro-o-azaaryl group of the dye is joined through a methine linkage to a basic heterocyclic nucleus containing an electron donating atom. These dyes are photobleachable. The photobleachable properties of the dyes make them useful in a variety of photographic applications. For example, they can be used to provide light-sensitive elements in which images can be formed in or on a support by exposure to light to which the dye is sensitive; or to provide photobleachable halation protection in photographic, including photothermographic, elements having coated thereon a photosensitive imaging layer. The dyes are also useful in filter layers.

17 Claims, No Drawings

O-NITRO-O-AZAARYLIDENE PHOTOBLEACHABLE DYES AND PHOTOGRAPHIC ELEMENTS UTILIZING THEM

BACKGROUND OF THE INVENTION

This invention relates to o-nitro-o-azaarylidene dyes and to elements containing a photobleachable o-nitro-o-azaarylidene dye.

The use of dyes in antihalation layers is well-known in the photographic art. These dyes have been incorporated in undercoat layers and backing layers of photographic elements as described in Carroll et al, U.S. Pat. No. 2,527,583. However, the incorporation of the dyes in this manner requires the coating of extra layers. This method also has associated with it the problem of how to remove the dye and/or modify its spectral absorption characteristics after its usefulness has ceased to exist. In one method, the antihalation dye is incorporated in a layer coated on the opposite side of the support from the picture-recording layers. This layer is then scrubbed off during processing. This method requires extra processing equipment solely for the purpose of removing the antihalation layer and presents the possibility of scratching the support material during the scrubbing operation. In another method, heat-sensitive antihalation dyes are destroyed or have their spectral absorption characteristics suitably altered by subjecting the photographic element to a sufficiently elevated temperature at some point during processing. With this method, the possibility exists of concurrently altering thermally sensitive image dyes adversely or of adversely affecting the dimensional stability of the image. It therefore is desirable to provide antihalation protection for photographic elements which avoid these difficulties.

Sturmer, Belgian Pat. No. 788,279, issued Feb. 28, 1973 describes a class of o-nitro-arylidene dyes which are photobleachable. The photobleachable property of these dyes permits their being used as antihalation dyes in photographic elements in such a way as to avoid the above-described problems associated with prior art antihalation dyes and layers. The patent additionally describes the dyes as being useful for other purposes in photographic elements such as imaging dyes, in filter layers and as desensitizers for silver halide emulsions. However, it has been found that the photodecomposition products of dyes of the above Sturmer patent tend to yield some unwanted density; i.e. they absorb radiation in some portions of the visible spectrum. While the amount of unwanted density obtained with such dyes would be acceptable for many purposes, it nevertheless would be desirable if the amount of density could be reduced or eliminated.

I have found that o-nitro-o-azaarylidene dyes are photobleachable and, hence, are useful in photographic elements in the same ways as the dyes described by Sturmer, yet the decomposition products of my dyes result in reduced amounts of unwanted density. While the reasons for this are not entirely clear, it appears that the o-nitro-o-azaarylidene dyes photodecompose in a different way than the o-nitro arylidene dyes to yield products which have less absorption in the visible region of the spectrum than do photodecomposition products of o-nitro arylidene dyes.

One aspect of my invention relates to novel photobleachable dyes. Another aspect of my invention relates to photographic elements containing these photobleachable dyes.

The dyes employed in the practice of my invention are o-nitro-o-azaarylidene dyes. As employed herein the term "o-nitro-o-azaarylidene" refers to the group formed by a methine linkage and an aromatic heterocyclic nitrogen group having a nitrogen atom in one of the positions ortho to the carbon atom to which the methine linkage is attached and having in the other ortho position a nitro-substituted carbon atom. The aromatic heterocyclic nitrogen group is joined through the methine chain linkage to a basic heterocyclic nucleus containing an electron-donating atom. The number of atoms joining the electron-donating atom and the nitro group is an even number. In a preferred form the aromatic heterocyclic nitrogen group is joined through an acyclic methine chain containing an odd number of methine groups to a basic heterocyclic nucleus of the type used in cyanine dyes. Typically, the electron-donating atom in the basic heterocyclic nucleus is a nitrogen, oxygen or sulfur atom. The aromatic heterocyclic nitrogen group can be a mono, bi or polycyclic aromatic nucleus and can contain additional nitrogen atoms. Typically, aromatic heterocyclic nuclei are pyridines, pyridazines, pyrimidines, pyrazines, quinolines, quinaldines, quinoxalines and the like.

Accordingly, one embodiment of my invention is a photobleachable o-nitro-o-azaarylidene dye in which the o-nitro-o-azaaryl group of the dye is joined through a methine linkage to a basic heterocyclic nucleus containing an electron donating atom linked to the nitro group through an even number of atoms.

In a specific preferred embodiment of my invention, the o-nitro-substituted dyes have the formula:

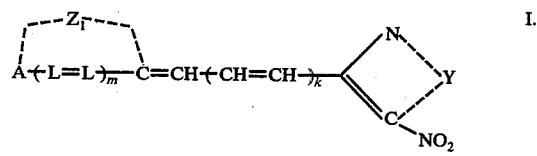   I.

wherein:
(a) $k$ represents 0 or 1;
(b) $m$ represents 0 or 1;
(c) each L represents a methine group, including substituted methine groups, (e.g., —CH=, —C(CH$_3$)=, etc.);
(d) A represents an electron donating moiety, such as oxygen (—O—), sulfur (—S—), or

(e) R$_1$ represents (1) an alkyl group having from 1 to 18 carbon atoms and preferably a lower alkyl group having from 1 to 4 carbon atoms (e.g., methyl, ethyl, propyl, isopropyl, butyl, secondary-butyl, isobutyl, tert-butyl, pentyl, hexyl, octyl, decyl, dodecyl, octadecyl); a sulfoalkyl group, preferably sulfo lower alkyl containing from 1 to 4 carbon atoms in the alkyl moiety (e.g., β-sulfoethyl, γ-sulfopropyl, γ-sulfobutyl, δ-sulfobutyl, etc.); a carboxyalkyl group, preferably a carboxy lower alkyl containing from 1 to 4 carbon atoms in the alkyl moiety (e.g., β-carboxyethyl, γ-carboxypropyl δ-carboxybutyl, etc.), a sulfatoalkyl group, preferably a sulfato lower alkyl containing from 1 to 4 carbon atoms in the alkyl moiety (e.g., β-sulfatoethyl, γ-sulfatopropyl, δ-sulfatobutyl, etc.); an alkoxyalkyl group, preferably a lower alkoxy lower alkyl containing from 1 to 4 carbon atoms in both the alkoxy and alkyl moieties (e.g., β-methoxyethyl, γ-methoxypropyl, δ-propoxybutyl, etc.); an acyloxyalkyl group, preferably an acyloxy lower alkyl containing from 1 to 4 carbon atoms in the alkyl moiety (e.g., acetyloxyethyl, propanoyloxyethyl, butanoyloxybutyl, benzoyloxyethyl, toloyloxypropyl, etc.); an alkoxycarbonylalkyl group, preferably a lower alkoxy carbonyl lower alkyl containing 1 to 4 carbon atoms in both the alkoxy and alkyl moieties (e.g., β-methoxycarbonylethyl, δ-ethoxycarbonylbutyl, β-butoxycarbonylethyl, etc.); a dialkylaminoalkylene group, preferably a di-lower alkylamino lower alkylene containing 1 to 4 carbon atoms in the alkylene and alkyl moieties (e.g., dimethylaminoethylene, diethylaminopropylene, diethylaminobutylene, etc.); a cycloaminoalkylene group, preferably cycloamino lower alkyl containing 4 to 6 atoms in the cycloamino moiety and 1 to 4 atoms in the alkyl moiety (e.g., pyrrolidinylethylene, morpholinopropylene, piperidinobutylene, pyrrolinylmethylene, etc.); (2) an alkenyl group (including a substituted alkenyl group), preferably a lower alkenyl containing 2 to 4 carbon atoms (e.g., ethenyl allyl, 1-propenyl, 1-butenyl, 2-butenyl, etc.), or (3) an aryl group (including a substituted aryl)—e.g., phenyl, naphthyl, tolyl, xylyl, halophenyl such as p-chlorophenyl, p-bromophenyl, etc., alkoxyphenyl such as methoxyphenyl, 2,4-dichlorophenyl, etc. and an aralkyl group, preferably an aryl lower alkyl containing from 1 to 4 carbon atoms in the alkyl moiety (e.g., benzyl, β-phenethyl, ω-phenbutyl, etc.)

(f) Y represents the atoms necessary to complete an azaaryl nucleus such as pyridine, pyridazine, pyrimidine, pyrazine, quinoline, quinaldine, quinoxaline, etc., including nuclei containing additional substituents, aside from the o-nitro substituent, such as nitro, halo, e.g. chloro, bromo and fluoro, lower alkoxy of 1 to 4 carbon atoms e.g. methoxy, ethoxy, butoxy, or other electron-withdrawing substituents; and (g) $Z_1$ represents the nonmetallic atoms necessary to complete a heterocyclic nucleus of the type used in cyanine dyes containing the electron-donating moiety A which ring can contain additional hetero atoms such as oxygen, nitrogen, selenium or sulfur. The heterocyclic nucleus preferably is selected from the group consisting of a thioazole nucleus including substituted and unsubstituted benzothiazole and naphthothiazole nuclei and the like, (e.g., thiazole, 4-methylthiazole, 4-phenylthiazole, 4,5-diphenylthiazole, 4-(2-thienyl)thiazole, benzothiazole, 4-chlorobenzothiazole, 4-methylbenzothiazole, 4-methoxybenzothiazole, 4-ethoxybenzothiazole, 4-phenylbenzothiazole, 5-chlorobenzothiazole, 5-bromobenzothiazole, 5-methylbenzothiazole, 5-methoxybenzothiazole, 5-ethoxybenzothiazole, 5-phenylbenzothiazole, 6-chlorobenzothiazole, 6-bromobenzothiazole, 6-methylbenzothiazole, 6-methoxybenzothiazole, 6-ethoxybenzothiazole, 5-methoxynaphtha[2,3-d]thiazole, β-naphthothiazole, α-naphthothiazole, 5-nitrobenzothiazole, 6-nitrobenzothiazole, 5-chloro-6-nitrobenzothiazole, etc.); an oxazole nucleus including substituted and unsubstituted benzoxazole and naphthoxazole nuclei and the like, (e.g., oxazole, 4-phenyloxazole, benzoxazole, 5-chlorobenzoxazole, 5-methylbenzoxazole, 5-bromobenzoxazole, 5-methoxybenzoxazole, 5-ethoxybenzoxazole, 5-phenylbenzoxazole, 5-methoxynaphthoxazole, 5-nitrobenzoxazole, 6-nitrobenzoxazole, 5-chloro-6-nitrobenzoxazole, etc.); a selenazole nucleus including substituted and unsubstituted benzoselenazole and naphthoselenazole nuclei and the like, (e.g., selenazole, 4-methylselenazole, 4-nitroselenazole, 4-phenylselenazole, benzoselenazole, 5-chlorobenzoselenazole, 6-chlorobenzoselenazole, naphtho[2,1-d]selenazole, 5-nitrobenzoselenazole, 6-nitrobenzoselenazole, 5-chloro-6-nitrobenzoselenazole, nitro group-substituted naphthoselenazoles, etc.); a thiazoline nucleus, (e.g., thiazoline, 4-methylthiazoline, 4-nitrothiazoline, etc.); a 2-pyridine nucleus, (e.g., 2-pyridine, 5-methyl-2-pyridine, etc.); a 4-pyridine nucleus (e.g., 4-pyridine, 3-methyl-4-pyridine, nitro group-substituted pyridines, etc.); a 3,3-dialkylindolenine nucleus (e.g., 3,3-dimethylindolenine, 3,3-diethyl-5 or 6-cyanoindolenine, 3,3-diethyl-5 or 6-nitroindolenine, 3,3-dimethyl-5 or 6-nitroindolenine, etc.); an imidazole nucleus, (e.g., imidazole, 1-alkylimidazole, benzimidazole, 1,3-dialkyl, 1,3-diaryl or 1-alkyl-3-arylimidazoles and benzimidazoles, such as 5-chloro-1,3-dialkylbenzimidazoles, 5-chloro-1,3-diarylbenzimidazoles, 5,6-dichloro-1,3-diarylbenzimidazoles, 5-methoxy-1,3-dialkylbenzimidazoles, 5-methoxy-1,3-diarylbenzimidazoles, 5-cyano-1,3-dialkylbenzimidazoles, 5-cyano-1,3-diarylbenzimidazoles, 1,3-dialkylnaphth[1,2-d]imidazole, 1,3-diarylnaphth[2,1-d]imidazole, etc.); a quinoline nucleus, (e.g., quinoline, 6-methylquinoline, 6-methoxyquinoline, 6-ethoxyquinoline, 6-chloroquinoline, 4-methoxyquinoline, 4-methylquinoline, 8-methoxyquinoline, β-methylquinoline, 4-chloroquinoline, 6-nitroquinoline, etc.); an imidazo-[4,5-b]quinoxaline nucleus (as described in Brooker and Van Lare, U.S. Pat. No. 3,431,111), (e.g., imidazo[4,5-b]-quinoxaline, 1,3-dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenylimidazo[4,5-b]-quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 1,3-diphenylimidazo[4,5-b]quinoxaline, 6-chloro-1,3-diphenylimidazo[4,5-b]-quinoxaline, etc.); a 3H-pyrrolo[2,3-b]pyridine nucleus, e.g., 3,3-dialkyl-3H-pyrrolo[2,3-b]pyridine such as 3,3-dimethyl-3H-pyrrolo[2,3-b]pyridine, 3,3-diethyl-3H-pyrrolo[2,3-b]pyridine, 1,3,3-trialkyl-3H-pyrrolo[2,3-b]pyridine such as 1,3,3-triethyl-3H-pyrrolo[2,3-b]pyridine, etc.); and a thiazolo[4,5-b]quinoline nucleus; a pyrylium (including benzopyrylium, thiapyrylium and benzothiapyrylium) nucleus; and a dithiolinium nucleus.

These dyes will hereinafter be referred to as o-nitro-substituted dyes.

The above dyes, wherein $k$ represents O, preferably are prepared by reacting a heterocyclic salt of the formula:

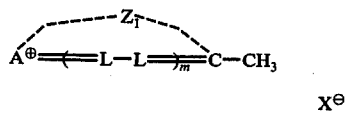

II.

with a nitro-substituted compound having the formula: III.

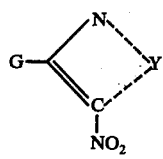

III.

In the above formulae II and III, $m$, A, $Z_1$, L and Y have the same meaning as defined above, G represents a halide such as fluoride, chloride or bromide, and X represents an acid anion (e.g., halide such as chloride, bromide, or iodide, p-toluenesulfonate, thiocyanate, sulfamate, perchlorate fluoroborate, methylsulfonate, ethylsulfonate, fluorosulfonate, 2,4-dinitrobenzenesulfonate, etc.).

In accordance with this process of preparation, nitro-substituted dyes are prepared by the nucleophilic substitution of a compound of formula II for the G substituent of the o-nitro-substituted compound of formula III. This reaction is advantageously conducted in a suitable solvent. Suitable solvents include any non-nucleophilic solvent such as acetonitrile, benzene, dimethylformamide, tetrahydrofuran, acetone, ether and the like. The quantity of solvent to provide a fluid reaction mixture, suitable from 2 to 10 weight units of solvent per weight unit of reactants.

The reaction is generally conducted at elevated temperatures to accelerate the reaction. Suitable temperatures range from about 40° C. up to about 150° C., although temperatures of from about 60° C. to about 100° C. are preferred. Most conveniently, a reaction solvent is chosen which has a boiling point at atmospheric pressure in the preferred range and the reaction is conducted at the reflux temperature of the reaction mixture.

The reaction time must be of sufficient duration to allow the reaction to go to completion. If conducted in the preferred range, the reaction is usually complete within 1 to 3 hours. The product is thereupon recovered from the reaction mixture. If acetonitrile is used as the reaction solvent, the dye is generally obtained as a crystalline product when the reaction mixture is cooled to room temperature and allowed to stand for several hours.

The above dyes wherein $k$ represents 1 are prepared by reacting a heterocyclic ammonium salt of the formula:

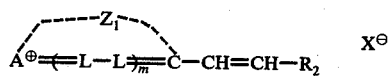

IV.

with a nitro-substituted compound having the formula:

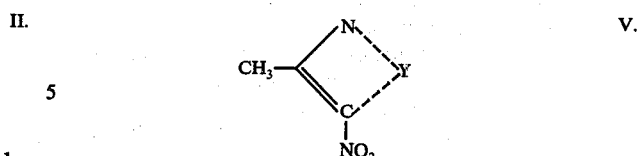

V.

In the above formulas IV and V; $m$, A, $Z_1$, L, Y and X have the same meaning as defined above. $R_2$ represents a displaceable electrophilic group such as anilino, acetanilino, alkoxy, halo, mercapto and the like. Instead of utilizing a single vinylene group attached to $R_2$ in formula IV, two or more vinylene groups can be interposed between $R_2$ and the heterocyclic ring and the resulting dye.

The above reaction is conducted in the presence of a base-solvent combination. Preferably the bases are non-nucleophilic bases such as diisopropylethylamine, sodium hydride, butyl lithium, etc. Suitable solvents include tetrahydrofuran, dioxane, dimethyl sulfoxide, acetonitrile and the like. Reaction times and temperatures can be chosen in the same manner as for the preceeding dye preparation method.

These ortho-nitro-substituted dyes exhibit excellent photobleaching properties. That is, they are colored until exposed to electromagnetic radiation to which they are sensitive. The dyes thereupon decolorize or are bleached in such a manner that they have significantly less absorbance. These dyes photobleach both in solutions as well as in the solid state, although the rate of bleaching is generally faster when in solution form.

The relative rate of bleaching of different compounds depends on various factors such as the heterocyclic moiety containing the electron donating atom (e.g., in formula I that portion of the formula containing $Z_1$). The rate of bleaching also depends upon the number of nitro groups on the azaaryl ring and their position relative to the methine chain.

The o-nitro-substituted dyes can be used with photographic supports and elements for several different purposes. In one form the dyes can be incorporated into a photographic support or coated onto the support in a binder and used to produce photographic images. One or more of the photobleachable dyes associated with the support are simply imagewise exposed to actinic electromagnetic radiation for a length of time sufficient to cause the amount of bleaching desired. Since the dyes bleach directly upon exposure, no processing is required in order to obtain a visible image. The images obtained can be viewed under low-intensity light or under lighting conditions not containing electromagnetic radiation to which dye or dyes are sensitive. A positive of the original image is obtained.

When the photograph is viewed under normal lighting conditions, the background areas initially protected from exposure will be bleached unless special precautions are taken. Since the intensity of normal indoor room lighting is generally much lower than the intensity of the exposing light, the image can be viewed for several minutes or more without significant degradation of quality. If it is later desired that the image be obliterated, this can be easily accomplished by blanket exposure to electromagnetic radiation until the image is no longer visible. Because of the nonstable properties of the photograph obtained, it can be used as a proof image. If a permanent record of the proof is desired, it can be photographically copied using conventional photographic materials.

Preferably, instead of relying upon the o-nitro-substituted dyes to produce images, they can be incorporated into a photographic element and employed for the antihalation protection of a separate light-sensitive imaging material. The dyes can be incorporated in the support for the element, in a separate layer between the support and the layer containing the light sensitive imaging material, or in a separate layer on the opposite side from the light sensitive layer. Additionally, the dyes can be dispersed within a light-sensitive imaging layer to reduce light scattering within the imaging layer and thereby contribute to the formation of sharper images—i.e., provide antihalation protection internally of the imaging layer.

Accordingly, one embodiment of my invention is a photographic element comprising a support, a light sensitive layer and incorporated in the support, in the light sensitive layer or in a separate layer adjacent to the support, a photobleachable o-nitro-o-azaarylidene dye in which the o-nitro-o-azaaryl group of the dye is joined through a methine linkage to a basic heterocyclic group containing an electron donating atom linked to the nitro group through an even number of atoms. In a specific embodiment the o-nitro dyes are used as antihalation dyes in photographic elements.

Inasmuch as the photobleachable o-nitro-substituted dyes provide antihalation protection by physical means, i.e. absorption of light, the nature of the light sensitive layer is not significant and any light sensitive materials which would benefit from antihalation protection could be used in the photographic elements of this invention. Preferably, the light sensitive layer contains photosensitive silver halide.

Since the optical density attributable to the dyes is readily decreased by exposure to light, there is no need to remove the dye after imagewise exposure of the light sensitive layer, as is typical of conventional antihalation materials. Further, by using the o-nitro-substituted dyes for antihalation protection, the difficulties of contamination of processing solutions or the use of separate processing steps required for antihalation layer removal can be avoided. It is to be recognized that in antihalation and filter layer applications the dye is not required to bleach on imagewise exposure. Rather the o-nitro-substituted dye can be primarily bleached after processing of the photographic element, if desired. For most applications the dyes are sufficiently bleached merely by allowing the exposed and processed photograph to remain uniformly exposed to ambient room light. It is, of course, recognized that the dyes can be quickly bleached by uniform exposure to actinic electromagnetic radiation at a higher intensity than ambient room light.

While the o-nitro-substituted dyes can be employed for antihalation and filtering with a variety of conventional photographic imaging layers, these dyes are particularly advantageous when employed in combination with photothermographic imaging layers. As is well appreciated by those skilled in the art, photothermographic elements are processed by heating to elevated temperatures, typically within the temperature range of from 80° to 170° C. The o-nitro-substituted dyes are well suited for use in photothermographic elements, since they surprisingly possess a high level of thermal stability, yet are readily photobleachable. The thermal stability of the o-nitro-substituted dyes is, of course, also advantageous in applications where it is desired to incorporate the dye into a melt from which the support is to be fabricated.

In still another application, when the o-nitro-substituted dyes are chosen to be adsorbed by silver halide crystals, they can be incorporated into a silver halide emulsion for the purpose of desensitizing the emulsion. This is particularly advantageous where it is desired to provide an emulsion that can be handled under safelight or ambient lighting conditions with retention of sensitivity to more intense or different wavelength radiation—e.g., X-ray radiation. Those o-nitro-substituted dyes which are not readily adsorbed by silver halide crystals are useful in silver halide emulsions as light absorbing (internal antihalation) dyes.

In a simple form the present invention is directed to a photographic support incorporating therein an o-nitro-substituted dye. In order to use the dyes for imaging or antihalation protection when incorporated within the support it is necessary that the support be transparent (and it is usually preferred that the support be substantially colorless) except for the dye present. A variety of conventional transparent photographic film supports are known to the art in which the o-nitro-substituted dyes can be incorporated. These supports can be broadly categorized for purposes of this discussion into those that can be solvent cast and those that are formed from a melt. The o-nitro-substituted dyes of this invention can be dissolved in nonionic solvents such as toluene, acetone, dichloromethane, dioxane, dimethylformamide, and the like. To incorporate the o-nitro-substituted dye into a solvent cast film support, such as a cellulosic support—e.g., cellulose nitrate, cellulose diacetate, cellulose triacetate, etc.—it is merely necessary to dissolve the support forming material and the dye in a common solvent system. The o-nitro-substituted dye can be incorporated into melt formed polymer film supports merely by dispersing the dye within the molten polymer. Since the o-nitro-substituted dyes possess a surprising degree of thermal stability they can be incorporated into melt formed film support materials such as polyalkylenes (e.g., polyethylene), polystyrene, terephthalic acid polyesters such as poly(ethylene terephthalate), polycarbonates and other, lower melting resinous polymers useful in forming film supports. It is generally preferred that the dyes be substantially homogeneously dispersed within the film support so as to exhibit uniform optical density upon viewing the support. This can be readily achieved by thoroughly mixing the dye with the support material using procedures well known in the art.

As is well understood by those skilled in the art very small quantities of antihalation dyes are incorporated in nominally transparent film supports for the purpose of minimizing halation due to laterally transmitted light. Accordingly, the dyes of the present invention will provide some degree of antihalation even when incorporated in quantities too low to be visually detected. However, for most antihalation applications it is preferred that the dyes be incorporated into the support in a concentration sufficient to provide an optical density of at least 0.5, most preferably at least 1.0, before photobleaching. For imaging applications the dye is incorporated in a concentration sufficient to yield an optical density differential between image and background areas of at least 0.05. However, for most imaging applications it is preferred that an optical density differential of at least 0.20 be obtainable and, most preferably, an optical density differential in excess of 0.50.

Where the o-nitro-substituted dye is coated onto a support rather than being incorporated therein, it is, of course, possible to employ any conventional photographic support. The support can be opaque or transparent. The support can take any one of a variety of diverse forms, such as a glass, metal, film, wood, paper or composite (e.g., resin coated paper) support. Where the dye is employed for imaging it is preferred that the dye be chosen to offer a visual contrast in hue or density with respect to the support. To immobilize spatially the dye on the support it is generally prferred that it be incorporated within a transparent binder. In one form the binder with the dye dispersed therein can be identical to the support compositions with the dye incorporated therein as previously discussed. The dye can also be incorporated into any conventional photographic vehicle. Generally any conventional transparent binder can be used. The binder layer containing the dye can be located directly on the support or can be separated by one or more undercoats provided for the purpose of improving adhesion to the support. Suitable conventional photographic vehicles useful as binders and layer arrangements are described in *Product Licensing Index*, Vol. 92, December 1971, publication 9232, page 108, paragraph VIII, here incorporated by reference. (*Product Licensing Index* is published by Industrial Opportunities, Ltd., Homewell Havant, Hampshire PO9 1EF, U.K.) Generally, the dye concentration in the binder layer is chosen to provide optical densities similar to those set forth above for dyes incorporated in the support. Optically homogeneous dispersion of the dye in the binder is preferred. This can be achieved by techniques well known to those skilled in the art.

One method which has been found to yield satisfactory results is to prepare a 5 to 10 percent by weight solution of the binding agent in a satisfactory solvent and to saturate the solution with the o-nitro-substituted dye. Generally any solvent which exhibits good solvent action for the binding agent is suitable. However, lower molecular-weight solvents having relatively high volatility such as acetone, methyl ethyl ketone, methanol, ethanol, ethyl acetate, butyl acetate and the like are particularly useful. When binding agents such as gelatin are used which are normally dissolved in water, it may be necessary to dissolve the dye in another solvent and disperse the dye solution in the binding agent solution to form an emulsion. Instead of being dissolved or emulsified in the binder the dye can be finely comminuted to minimize graininess, preferably to average particle sizes of less than 5 microns, most preferably below 1 micron, and simply uniformly dispersed in the binder of agent solution.

The dye blended in the binder or binding agent solution is coated on the support to form the photographic element. Coating can be accomplished by various coating procedures including dip-coating, air-knife coating, curtain-coating, doctor-blade coating or extrusion coating using hoppers of the type described in Beguin, U.S. Pat. No. 2,681,294. If desired, two or more layers may be coated simultaneously by the procedures described in Russell, U.S. Pat. No. 2,761,791, and Wynn, British Pat. No. 837,095. The coverage at which the dispersion is coated on the support can vary widely depending upon the properties of the particular blend and the results to be achieved. For example, satisfactory results are generally obtained when a 5 to 10 percent by weight solution of the binding agent saturated with dye is coated. Wet coated thicknesses of 2 to 100 microns are generally preferred for imaging applications with coatings of like thicknesses or considerably less being useful for antihalation applications.

Where the o-nitro-substituted dyes are to be employed for imaging, it is unnecessary that any other radiation-responsive material be present. In a simple form then a photographic element useful for producing an image can consist of only the support with the dye incorporated therein or incorporated thereon in a binder layer. An image is formed merely by exposing the o-nitro-substituted dye to actinic electromagnetic radiation. Additional dye, addenda, layers and structural features can be associated with the photographic element which are not incompatible with the intended imaging application.

The electromagnetic radiation to which the dyes are sensitive varies with each particular dye and ranges from the long-wavelength ultraviolet region and into the infrared region, but usually falls in the visible region. Generally speaking, suitable imaging exposures can be accomplished with a tungsten light source. Exposure time depends upon the intensity of the source.

To use the o-nitro-substituted dyes for antihalation protection it is merely necessary to have at least one other radiation-sensitive layer associated with the support. Where the o-nitro-substituted dye is incorporated in a binder layer, this layer can be overcoated with the additional radiation-sensitive layer. Alternatively, the binder layer can be located on the opposite face of the support from the additional radiation-sensitive layer. It is merely necessary that the o-nitro-substituted dye be capable of absorbing radiation of a wavelength capable of exposing the additional radiation-sensitive layer in order for the dye to provide effective antihalation protection.

Where it is desired to employ the dyes for filtering, the o-nitro-substituted dyes can be used in a separate layer similar or identical to the antihalation layer described above, but with the difference that the filter layer overlies at least one other radiation-sensitive layer. Where a plurality of radiation-sensitive imaging elements are employed, as in color photography, the filter layer can be advantageously located between adjacent radiation-sensitive imaging layers. As is well understood by those skilled in the art, the optical density and spectral absorption of the dye in the filter layer can be varied widely, depending upon the particular choice of radiation-sensitive imaging layers and photographic effects desired. Typically the o-nitro-substituted dyes are employed for filtering purposes in concentrations sufficient to yield optical densities of 3.0 or less, most typically from 0.5 to 2.0. The photobleaching and thermal stability characteristics of the o-nitro-substituted dyes are advantageous in filter layers similarly as in antihalation layers.

While the additional radiation-sensitive layer can take any one of a variety of conventional forms, it is particularly contemplated to employ the o-nitro-substituted dyes for antihalation protection and for filtering with silver halide emulsion coatings. It is further considered particularly advantageous to utilize the o-nitro-substituted dyes for antihalation and filtering in photothermographic elements.

The described o-nitro-substituted dyes are useful in a variety of photothermographic elements.

Exemplary photographic elements are described, for instance, in U.S. Pat. No. 3,672,904 of deMauriac, issued June 27, 1972; Belgian Pat. No. 802,519, issued Jan. 18, 1974; U.S. Pat. No. 3,457,075 of Morgan et al, issued July 22, 1969; U.S. Pat. No. 3,409,438 of Lokken, issued Nov. 5, 1968 and U.S. Reissue Pat. No. 26,719 of Sorensen et al, issued Nov. 18, 1969; U.S. Pat. No. 3,392,020 of Yutzy et al, issued July 9, 1968; U.S. Pat. No. 3,645,739 of Ohkubo, issued Feb. 29, 1972; Belgian Pat. No. 765,452, issued May 28, 1971; U.S. Pat. No. 3,152,903 of Shepard et al, issued Oct. 13, 1964; U.S. Pat. No. 3,589,901 of Lyons, issued June 29, 1971; U.S. Pat. No. 3,589,903, issued June 29, 1971; U.S. Pat. No. 3,764,328 of Birkeland, issued Oct. 9, 1973; and U.S. Pat. No. 3,764,329 of Lee, issued Oct. 9, 1973.

Other exemplary photothermographic elements in which the described o-nitro-substituted dyes are useful are described in U.S. Pat. No. 3,506,444 of Haist et al, issued Apr. 14, 1970; Belgian Pat. No. 799,262, issued Nov. 8, 1973; and Belgian Pat. No. 766,590, issued June 15, 1971.

It is specifically recognized that the o-nitro-substituted dyes of this invention can be used as an absorber dye directly within a radiation-sensitive layer to prevent radiation scattering within this layer. By absorbing scattered radiation sharper images are obtained. It is specifically contemplated to incorporate the o-nitro-substituted dyes in silver halide emulsions to act as absorber dyes. Since the o-nitro-substituted dyes can be photobleached after the photographic element is fully processed, the concentration of the o-nitro-substituted dye is typically limited only by the reduction in speed that can be tolerated for the radiation-sensitive layer. Very low levels of incorporated o-nitro-substituted dye will produce a significant increase in sharpness, since a significant component of scattered radiation moves laterally. For most applicantions it is preferred to incorporate from 0.01 to 0.40 gram of o-nitro-substituted dye per gram of silver halide present in the radiation-sensitive layer. The dye is, of course, chosen to absorb radiation of a wavelength to which the radiation-sensitive layer is responsive.

In addition to acting as an absorbing dye which provides internal antihalation protection to a radiation-sensitive layer the o-nitro-substituted dye can also act as a desensitizer for silver halide emulsions. It is preferred to employ those o-nitro-substituted dyes of this invention as absorber dyes in silver halide emulsions which are less readily or totally unadsorbed by silver halide crystals and to employ those remaining dyes which are more readily adsorbed by silver halide crystals as desensitizers.

As used herein, "a desensitizer" for a photographic silver halide emulsion refers to a dye which, when added to a gelatinous silver bromoiodide emulsion containing 2.5 mole percent iodide (based on total silver halide) at a concentration of from 0.01 to 0.4 gram of dye per mole of silver halide, causes a loss in the blue speed of the emulsion when sensitometrically exposed and developed for 6 minutes in an Elon-hydroquinone developer at room temperature. Preferred desensitizers are those which, when tested as just described, cause a loss of at least 50 percent and preferably 90 percent or more of speed to blue radiation.

The o-nitro-substituted dyes can be incorporated into radiation-sensitive layers, such as silver halide emulsion coatings, by techniques well known to those skilled in the art. For example, to prepare a gelatino-silver halide emulsion incorporating the o-nitro-substituted dye, a quantity of the dye is dissolved in methyl alcohol or other suitable solvent, and this solution (which can be diluted with water) containing the dye is slowly added to 1000 cc of a gelatino-silver halide emulsion with stirring. It is, of course, desired to substantially uniformly disperse the dye within the radiation-sensitive layer, so that localized variations in coating response are minimized. The radiation-sensitive layers and the silver halide emulsion layers specifically can take any desired conventional form, and it is specifically contemplated to employ the o-nitro-substituted dyes in multilayer elements, such as those typically employed to form conventional color photographs. Typical emulsions, addenda, coatings and coating combinations contemplated for use with the o-nitro-substituted dyes are illustrated by those disclosed in *Product Licensing Index*, Vol. 92, December 1971, publication 9232, pages 107 through 110, (*Product Licensing Index* is published by Industrial Opportunities, Ltd., Homewell Havant, Hampshire PO9 1EF, U.K.), the disclosure of which is here incorporated by reference.

The following examples are included to illustrate further the invention.

EXAMPLE 1

This example describes the preparation of 2-[(4,6-dinitro-2-pyridyl)methylene]-1,2-dihydro-1,3-dimethyl quinoxaline.

1,2,3-trimethylquinoxalinium fluorosulfonate (0.005 mole) and 2-chloro-3,5-dinitropyridine (0.005 mole) were dissolved in acetonitrile (15 ml) and combined with triethylamine (0.015 mole). After the solution was allowed to stand overnight at room temperature, while protected from light, the resulting dye precipitate was collected by filtration, washed with methanol and dried; yield 1.11 g, m.p. 214°–216° C. The dye was recrystallized from 350 ml of acetonitrile; yield 0.30 g, $\lambda_{max}$ (in acetonitrile) 545 nm ($\epsilon = 3.62 \times 10^4$).

EXAMPLES 2 and 3

These Examples compare the photoproducts obtained upon irradiation of the o-nitro-o-azaarylidene dyes (Dye E on page 26) of this invention and the o-nitroarylidene dyes (Dye D on page 26) of Sturmer, Belgian Pat. No. 788,270. Dye E was dissolved in ethyl acetate and irradiated ($\lambda > 500$ nm) until all the dye had been destroyed. Analysis by thin layer chromatography indicated two colorless products (80% yield) which were identified as Compounds 1 and 2E on page 26 (X = N). No evidence was found for the formation of Compound 3E shown on page 26 (X = N).

However, when Dye D was photolyzed under similar conditions, the major product (78%) isolated was Compound 3D shown on page 26 (X = CH), a reddish-yellow solid, $\lambda_{max}$ (in acetonitrile) 420 nm ($\epsilon = 1900$). Traces of 1 and 2D (X = CH) were detected.

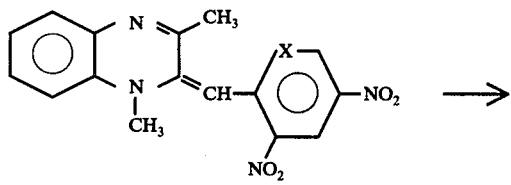

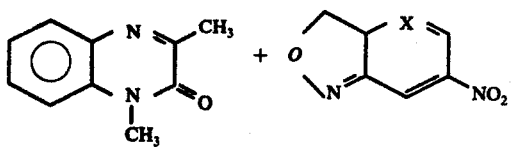

Dye D (X = CH)
Dye E (X = N)

EXAMPLES 4–17

Several dyes of the invention and of Belgian Pat. No. 788,279 were photolyzed both in an ethyl acetate solution and after incorporation in a cellulose acetate film support. The absorption maxima and extinction coefficients for the photoproducts were recorded (see Table I). A "stain ratio" was derived for the photoproducts; the "stain ratio" for a dye is the optical density of the dye at its $\lambda_{max}$ divided by the optical density of the photoproducts in the photobleached solution or support at 425 nm. This absorption peak (425 nm) corresponds to the maximum visible absorption peak for the yellow photoproducts analogous to 3. A low stain ratio (SR) indicates the presence of a large amount of a highly colored photoproduct. A high stain ratio (SR) indicates a preponderance of colorless photoproducts, e.g. compounds 1 and 2 on the preceding page.

The extinction coefficients and absorption maxima of the respective dyes prior to exposure are shown in Table I.

TABLE 1

| Dye | R | $\lambda_{max}$ In Acetonitrile | Stain Ratio 425nm | |
|---|---|---|---|---|
| | | | Ethyl Acetate | Acetate Support |
| *A | DN Phenyl[a] | 525nm (3.6) | 24 | 25 |
| B | N Pyridine[b] | 414 (2.9); 460 s (2.0) | 35 | — |
| C | DN Pyridine[c] | 525 (7.4) | 120 | 54 |
| *D | DN Phenyl | 520 (2.1) | 10 | 11 |
| E | DN Pyridine | 545 (3.6) | 35 | 25 |
| F | N Pyrimidine[d] | 463 (2.7) | 60 | 22 |
| *G | DN Phenyl | 593 (1.9) | 18 | 17 |
| H | DN Pyridine | 585 (6.4) | 42 | 32 |
| I | N Pyrimidine | 494 (7.3) | 100 | 49 |
| *J | DN Phenyl | 560 (2.8) | 14 | 18 |
| K | DN Pyridine | 548 (6.6) | 45 | 28 |
| L | N Pyrimidine | 450 (4.3); 473 (3.8) | 80 | 32 |

TABLE 1-continued

| Dye | R | $\lambda_{max}$ In Acetonitrile | Stain Ratio 425nm Ethyl Acetate | Acetate Support |
|---|---|---|---|---|
| 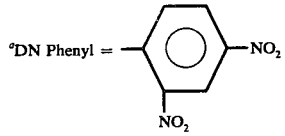 | M DN Phenyl<br>N DN Pyridine | 520 (2.1)<br>547 (3.6) | 13<br>36 | 11<br>36 |

*Denotes prior art dyes.

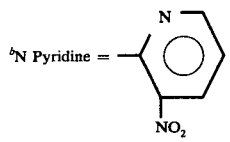

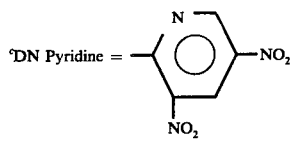

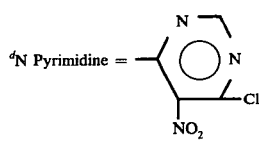

This invention has been described in detail with particular reference to preferred embodiments thereof, but it will be understood that variations and modifications can be effected within the spirit and scope of the invention.

What is claimed is:

1. A photographic element comprising a support, a light sensitive layer and, incorporated in the support, in the light sensitive layer or in an otherwise non-light sensitive layer adjacent the support, a photobleachable o-nitro-o-azaarylidene dye having the structure:

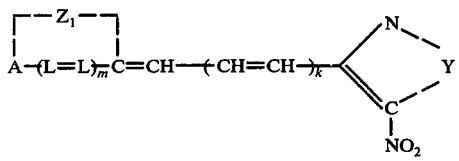

wherein:
(a) k represents 0 or 1;
(b) m represents 0 or 1;
(c) each L represents a methine group;
(d) A represents an electron donating moiety selected from oxygen, sulfur or

wherein $R_1$ represents an alkyl group, an alkenyl group or an aryl group;

(e) $Z_1$ represents the nonmetallic atoms necessary to complete a basic heterocyclic nucleus of the type used in cyanine dyes; and (f) Y represents the atoms necessary to complete a pyridine nucleus, a pyridazine nucleus, a pyrimidine nucleus, a pyrazine nucleus, a quinoline nucleus, a quinaldine nucleus or a quinoxaline nucleus.

2. A photographic element of claim 1 wherein the photobleachable dye is in the light sensitive layer.

3. A photographic element of claim 2 wherein the light sensitive layer comprises photosensitive silver halide.

4. A photographic element of claim 1 wherein the photobleachable dye is in an otherwise non-light sensitive layer adjacent the support.

5. A photographic element of claim 1 wherein the photobleachable dye is in an otherwise non-light sensitive layer between the support and the light sensitive layer.

6. A photographic element of claim 1 wherein the photobleachable dye is in an otherwise transparent support.

7. A photographic element of claim 6 in which said support is comprised of the photobleachable dye and a transparent polymer.

8. A photographic element of claim 7 in which the photobleachable dye is homogeneously blended with the transparent polymer.

9. A photographic element of claim 7 in which the support is comprised of cellulose acetate or poly(ethylene terephthalate).

10. A photographic element of claim 6 wherein the light sensitive layer comprises photosensitive silver halide.

11. A photographic element of claim 1 wherein $Z_1$ represents the nonmetallic atoms necessary to complete a thiazole nucleus, an oxazole nucleus, a selenazole nucleus, a thiazoline nucleus, a pyridine nucleus, an imidazole nucleus, a quinoline nucleus, an indolenine nucleus, an imidazo[4,5-b]quinoxaline nucleus, a 3H-pyrrolo[2,3-b]pyridine nucleus, a thiazolo[4,5-b]quinoline nucleus or a quinoxaline nucleus.

12. A photographic element of claim 1 in which A represents

and $R_1$ is an alkyl group.

13. A photographic element of claim 12 wherein Y represents the atoms necessary to complete a pyridine or pyrimidine nucleus.

14. A photographic element of claim 13 wherein $Z_1$ represents the nonmetallic atoms necessary to complete a quinoxaline, an imidazo[4,5-b]quinoxaline or a quinoline nucleus.

15. A photographic element comprising a support, a light sensitive silver halide layer and incorporated in the support or in a layer adjacent to the support a photobleachable antihalation dye having the structure

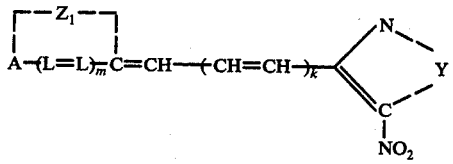

wherein:
(a) k represents 0 or 1;
(b) m represents 0 or 1;
(c) each L represents a methine group;
(d) A represents

where $R_1$ is alkyl;
(e) $Z_1$ represents the nonmetallic atoms necessary to complete a quinoxaline, an imidazo[4,5-b]quinoxaline or a quinoline nucleus; and
(f) Y represents the atoms necessary to complete a pyridine or pyrimidine nucleus.

16. A photographic element of claim 15 wherein the photobleachable dye is 2-[4,6-dinitro-2-pyridyl)methylene]-1,2-dihydro-1,3-dimethyl quinoxaline.

17. A photographic element comprising a support, a light sensitive silver halide layer and, incorporated in the support, in the light sensitive silver halide layer or in an otherwise non-light sensitive layer adjacent the support, a photobleachable o-nitro-o-azaarylidene dye having the structure:

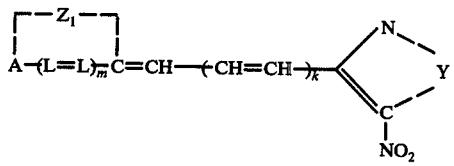

wherein:
(a) k represents 0 or 1;
(b) m represents 0 or 1;
(c) each L represents a methine group;
(d) A represents an electron donating moiety selected from oxygen, sulfur or

where $R_1$ represents an alkyl group, an alkenyl group or an aryl group;
(e) $Z_1$ represents the nonmetallic atoms necessary to complete a basic heterocyclic nucleus of the type used in cyanine dyes; and
(f) Y represents the atoms necessary to complete a pyridine nucleus, a pyridazine nucleus, a pyrimidine nucleus, a pyrazine nucleus, a quinoline nucleus, a quinaldine nucleus or a quinoxaline nucleus.

* * * * *